United States Patent
Brinker et al.

(10) Patent No.: US 10,257,592 B2
(45) Date of Patent: Apr. 9, 2019

(54) REMOTE TOWER MONITORING

(71) Applicant: SmarTower Systems, LLC, Peoria, IL (US)

(72) Inventors: David G. Brinker, Metamora, IL (US); Mark S. Allen, Peoria, IL (US)

(73) Assignee: Smart Tower Systems, LLC, Peoria, IL (US)

(*) Notice: Subject to any disclaimer, the term of this patent is extended or adjusted under 35 U.S.C. 154(b) by 0 days.

(21) Appl. No.: 15/077,390

(22) Filed: Mar. 22, 2016

(65) Prior Publication Data
US 2016/0286286 A1 Sep. 29, 2016

Related U.S. Application Data

(60) Provisional application No. 62/136,956, filed on Mar. 23, 2015.

(51) Int. Cl.
*H04Q 9/00* (2006.01)
*G01M 5/00* (2006.01)
*G01B 21/32* (2006.01)

(52) U.S. Cl.
CPC ............ *H04Q 9/00* (2013.01); *G01M 5/0025* (2013.01); *G01B 21/32* (2013.01); *H04Q 2209/10* (2013.01); *H04Q 2209/823* (2013.01)

(58) Field of Classification Search
CPC ............... H04Q 9/00; H04Q 2209/10; H04Q 2209/823; G01H 17/00; G01P 15/00; H02G 7/14; H02G 7/18; G01M 5/0025; G01B 21/32; H04B 3/52; H04B 3/54; H04B 3/56
See application file for complete search history.

(56) References Cited

U.S. PATENT DOCUMENTS

| | | | | |
|---|---|---|---|---|
| 2007/0270037 A1* | 11/2007 | Deterre | ..................... | H01R 4/72 439/607.41 |
| 2008/0246507 A1* | 10/2008 | Gunn | ....................... | G01R 1/22 324/764.01 |
| 2011/0080283 A1* | 4/2011 | Schweitzer, III | .... | G01R 31/085 340/539.26 |
| 2012/0054540 A1* | 3/2012 | Howard | ................ | G06F 9/4401 714/6.12 |
| 2012/0073382 A1* | 3/2012 | Spaltmann | .......... | G01M 5/0025 73/788 |
| 2012/0182130 A1* | 7/2012 | Sarchi | ..................... | G01L 5/047 340/10.1 |
| 2012/0185187 A1* | 7/2012 | Parakulam | ............... | H04Q 9/00 702/63 |
| 2013/0227337 A1* | 8/2013 | Howard | ................ | G06F 9/4401 714/4.3 |
| 2014/0136140 A1* | 5/2014 | Chan | ...................... | G01H 17/00 702/141 |
| 2014/0278150 A1* | 9/2014 | Baesler | .................. | E04H 12/00 702/34 |
| 2015/0075282 A1* | 3/2015 | Chan | ...................... | G01H 17/00 73/495 |

(Continued)

*Primary Examiner* — Orlando Bousono
(74) *Attorney, Agent, or Firm* — Dickinson Wright PLLC

(57) ABSTRACT

Disclosed herein are systems, methods, and circuits configured to monitor the displacement of a tower, report the monitored displacement via a networked connection, and determine that the tower is in a non-optimal state. By providing the aspects disclosed herein, an operator of a tower may optimize the tower's function, and potentially prevent the tower from breaking at an earlier stage.

17 Claims, 15 Drawing Sheets

(56) References Cited

U.S. PATENT DOCUMENTS

| | | | |
|---|---|---|---|
| 2016/0080035 A1* | 3/2016 | Fuchs | H01P 3/16 375/257 |
| 2016/0080839 A1* | 3/2016 | Fuchs | H01Q 1/46 340/870.01 |
| 2016/0105239 A1* | 4/2016 | Henry | H04B 3/52 398/116 |
| 2016/0112132 A1* | 4/2016 | Gerszberg | H01Q 1/50 398/116 |
| 2016/0221039 A1* | 8/2016 | Fuchs | B06B 1/18 |
| 2016/0276725 A1* | 9/2016 | Barnickel | H04B 3/54 |

* cited by examiner

LATERAL DISPLACEMENT OF TOWER STRUCTURES

REMOTE TOWER MONITORING

CROSS-REFERENCE TO RELATED APPLICATIONS

This application claims benefit of U.S. Provisional Application No. 62/136,956, filed Ma. 23, 2015 entitled "Remote Tower Monitoring,", the entire disclosure of the application being considered part of the disclosure of this application and hereby incorporated by reference.

BACKGROUND

Towers may be employed for a plurality of applications. For example, towers are employed to transmit resources such as energy, oil, water, etc. or information from a first location to another. The information being propagated from a first point to a second point may be network related, energy related, communications related, or the like. In another context, a tower may be situated to collect information about a location, such as weather or other environmental information. Towers may be situated to support equipment, such as wind turbines or the like. Towers may serve as a smoke stack or other similar functions in power generating stations, factories or the like. Towers in this application, may be, but not limited to, latticed towers, guyed masts and pole structures.

A tower may be situated in numerous contexts, environments, and locations. Thus, the tower may be affected by various external phenomena, such as natural disasters, environmental conditions, physical contact, or normal wear and tear. Thus, as a tower interacts with the various external phenomena, the tower's efficacy may be compromised. In certain situations, if a tower is misaligned, the tower's ability to be a host or provide a service may either be lessened or effectively be cancelled.

Conventional techniques for handling situations as described above require engaging a technician to inspect each tower, or fixing a tower after the tower has become inoperable. In the former case, engaging a technician may be costly, ineffective, and a non-robust solution. Further, certain towers may be in areas that are geographically remote, and thus, not very easy to travel to.

Further, in the latter case, if towers are repaired after a problem is detected, considerable downtime may be experienced. Because the tower is compromised (and in some cases beyond repair), the system associated with the tower may be rendered inoperable until the tower is either repaired or replaced.

FIGS. 1(a) and (b) illustrate several deleterious conditions that may lead to tower 100 problems related to structural integrity. The problems shown related to wind 11, 12, 150, water, earthquakes 160, foreign objects 170 (i.e. a person or vehicle), a guy failure, and the like. Essentially, as shown in FIGS. 1(a) and (b), numerous conditions may occur that cause a tower to fail. In particular, the figures illustrate multiple types of deformations: rotation MO and displacement 110, 120, 130.

Conventional techniques for detecting deformations are solely directed to rotational detection. However, problems may occur due to the displacement of a tower, and thus, these problems may be left unaddressed in detecting, monitoring, and repairing issues affecting tower implementations.

Thus, the conventional techniques for addressing tower related problems associated with structural integrity are lacking for at least the above-stated reasons.

DESCRIPTION OF THE DRAWINGS

The detailed description refers to the following drawings, in which like numerals refer to like items, and in which:

FIG. 12 illustrates an example of a system/server employing the aspects disclosed herein.

SUMMARY

Figure 1A:
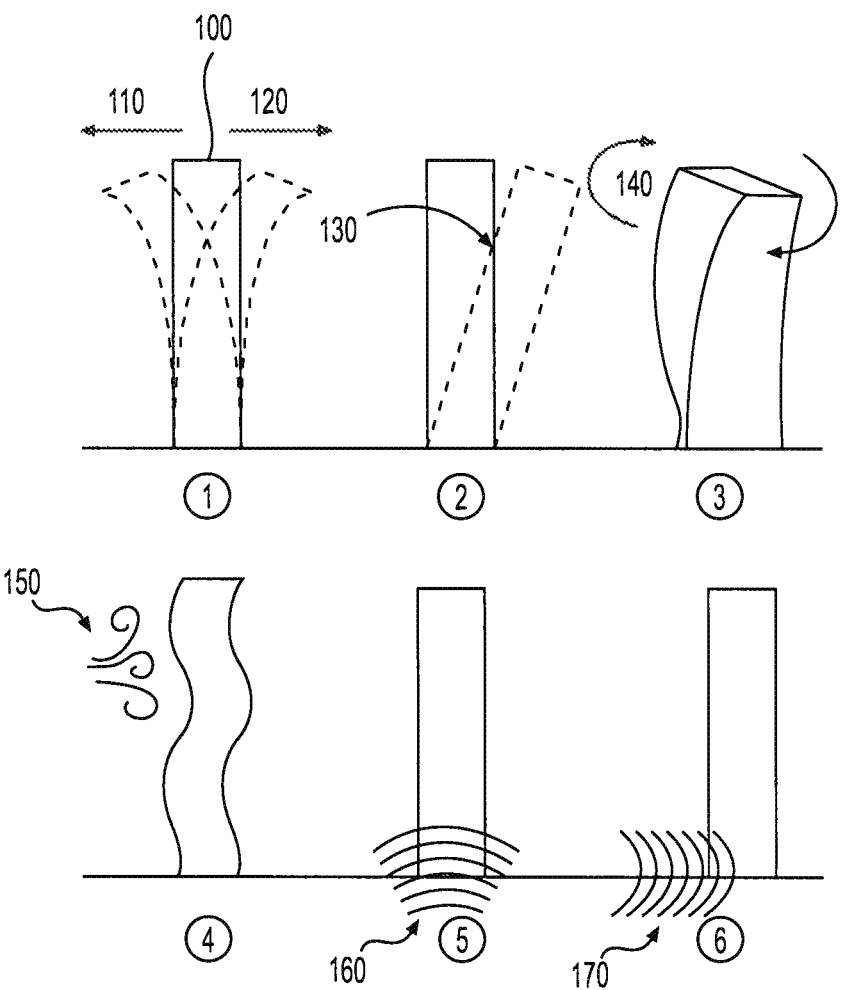
FIGS. 1(a)-(c) illustrate various scenarios associated with tower failure/deformations due to structural integrity issues.

A circuit for monitoring a tower is included herein. The circuit monitors various deleterious situations that may affect the tower from proper operation. Further, systems and methods are included herein for implementing the circuit.

DETAILED DESCRIPTION

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination of the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Towers allow for electrical signals to be propagated from a first location to another. The electrical signals may be power, communication information, cable lines, network connectivity, and the like (it will be noted there are other uses for towers not enumerated above and known in the art). In some cases, the towers may be coupled to one another via a wire or some other conduit for transporting energy or information. In other cases, the tower may be a wireless base station, i.e. a node for conveying wireless information.

Figure 1B:
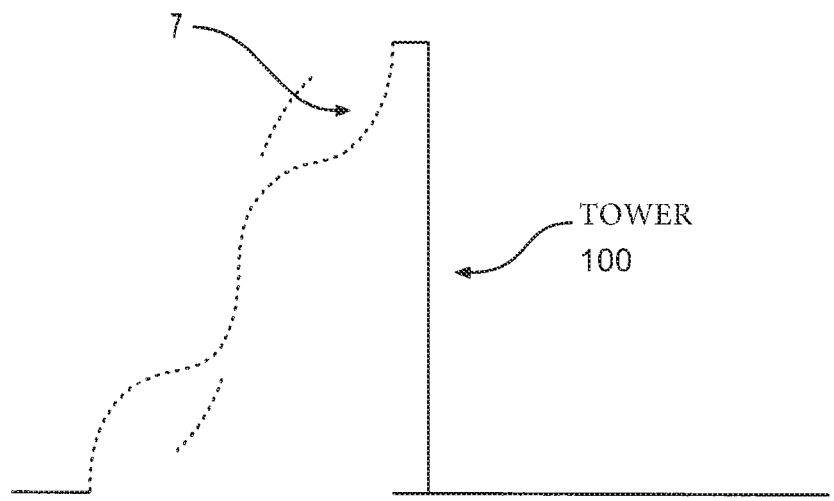
Figure 1B:
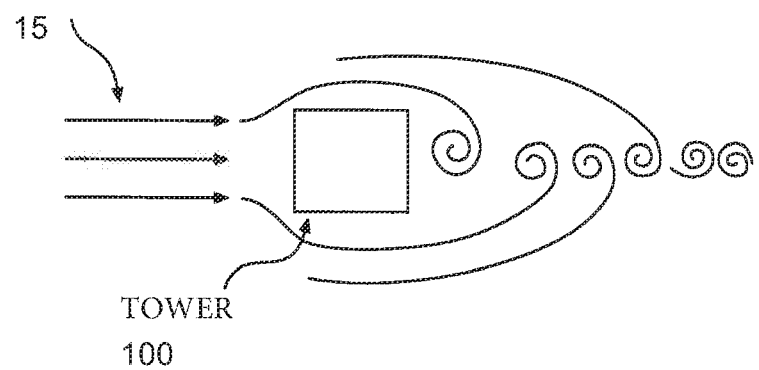

As shown in FIGS. 1(a) and (b), in the various scenarios shown, different environmental effects may cause a tower to fail or not operate properly. Once the tower is deformed, the operation of fixing the tower after a problem occurs may be costly and inconvenient. Two key deformations are shown in the examples in FIGS. 1(a) and (b), a rotational deformation and a displacement deformation. In certain applications, a rotational deformation may eventually cause a failure associated with the tower. As shown in FIG. 1(b), a displacement deformation 7 may eventually cause a failure associated with the tower 100. Thus, being capable of detecting both the rotational deformation and the displacement deformation 7 becomes vital in remotely monitoring a tower operation.

Figure 1C:
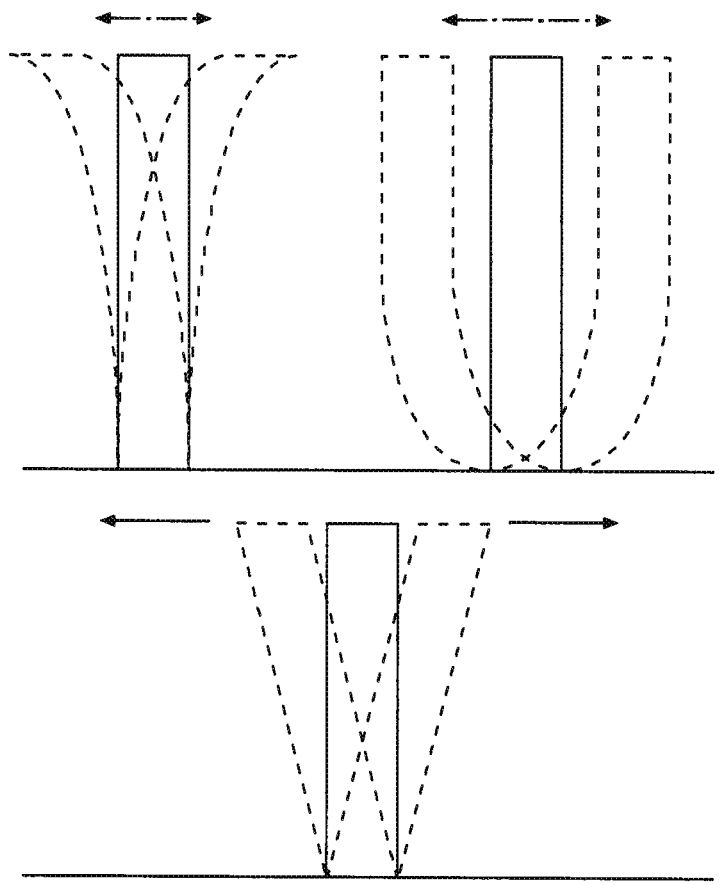

FIG. 1(c) specifically shows lateral displacement deformations that may occur to a tower structure. As shown, various portions of the tower in FIG. 1(c) moves from one location to another.

Conventional techniques for detecting a displaced or malformed tower are not robust or effective enough. The conventional techniques require considerable resources to inspect towers, and may lead to tower-related failures when structural issues are not detected in a timely manner. Further, conventional techniques merely concern a detection of rotational deformations, and ignore displacement deformations.

Disclosed herein are methods, systems, and devices for remotely monitoring a tower. The aspects disclosed herein allow for remote management of tower-related deformations. Thus, management of towers may be done in a more cost effective manner. Further, with remote monitoring, towers that are geographically away from a source of detection may effectively be monitored in a cost effective and timely manner.

Further, the aspects disclosed herein may detect whether a tower has been malformed over a predetermined threshold, so as to detect an error prior to the tower becoming inoperative. Thus, costly down time and failures due to the tower being displaced or malformed may be addressed before the displacement causes tower failure to occur.

In another embodiment, the tower's performance may be monitored and recorded over time. For example, because the tower is being monitored over time, various designs and modifications may be studied and analyzed to determine how effective those designs and modifications are to the overall lifetime and performance of the tower.

Figure 2A:
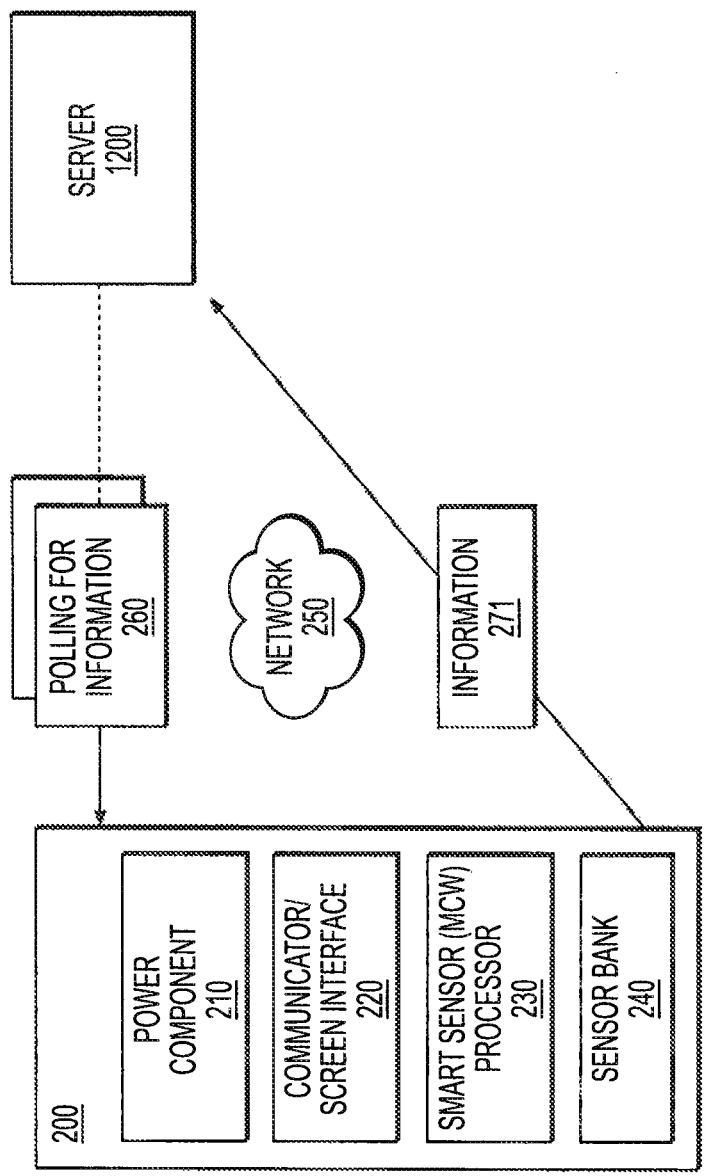
FIGS. 2(a)-(c) illustrates an example of a system according to the aspects disclosed herein.
Figure 2B:
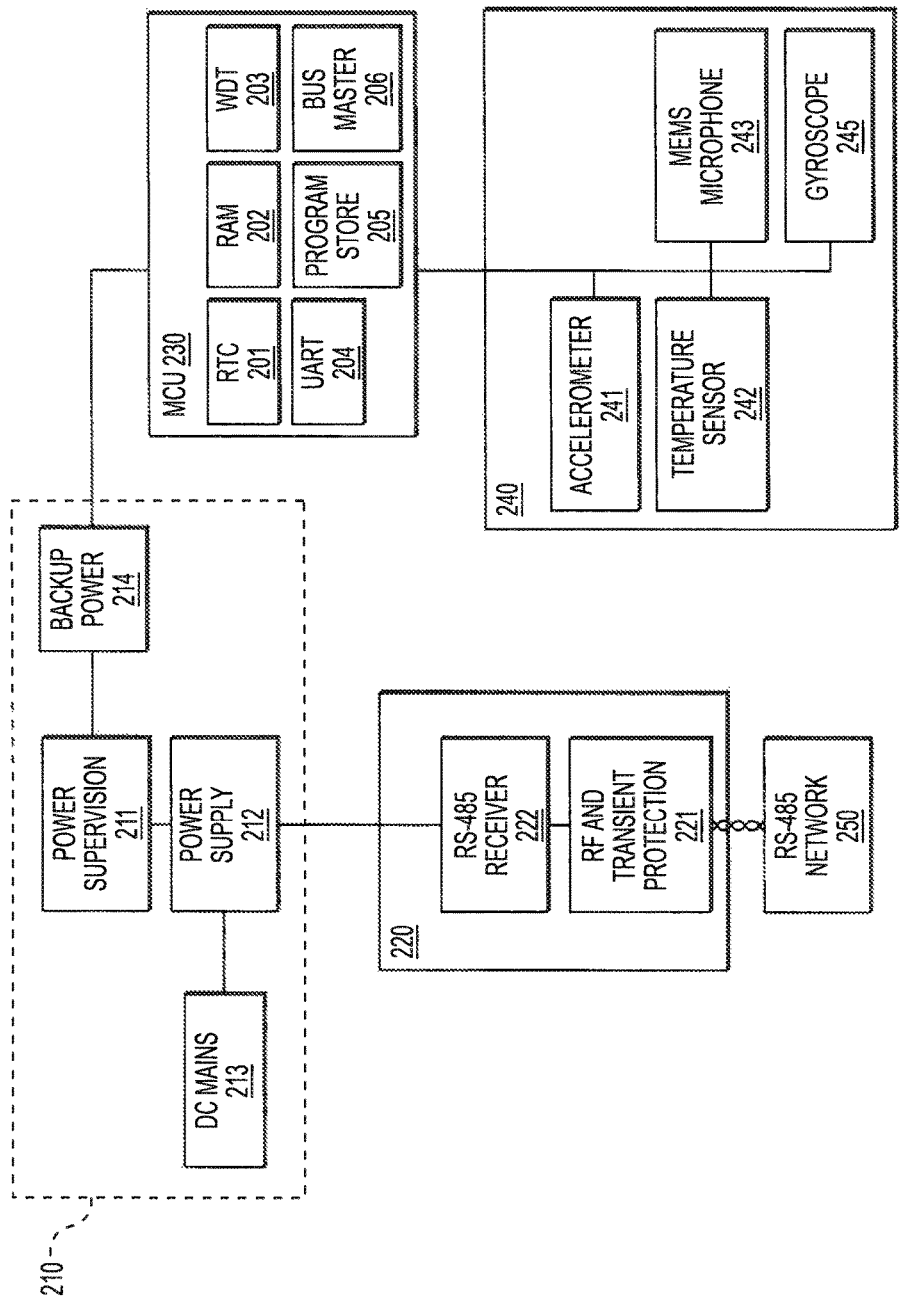

FIG. 2(b) illustrates a system 200 for sensing deformations on a tower 290. The system shown in FIG. 2(b) is a circuit based implementation. The various elements provided therein allow for a specific implementation. Thus, one of ordinary skill in the art of electronics and circuits may substitute various components to achieve a similar functionality. The tower 290 is shown in implementations described in further figures, such as those shown in FIGS. 5-11. The system 200 may be implemented via a microcontroller (MCU), an application specific integrated circuit (ASIC), a field programmable gate array (FPGA), or other electrical circuit implementable techniques known to one of ordinary skill in the art. The system 200 may be programmed via a non-transitory computer readable medium stored in the MCU or other circuits described above.

The system 200 is coupled to various power devices, communication circuitry, and other auxiliary componentry shown in FIG. 2. These components shown, such as backup power node 214, power supervision circuit 211, a power supply 212, and the DC power supply 213, which each compose the power system 210 provided along with an implementation of system 200. The power system 210 shown is one such implementation, and an implementer of system 200 may employ other power systems capable of existing on a tower 290.

Also shown in FIG. 2(b) is a communication circuit 220. The communication circuit 220 may include a receiver 222, and a protection circuit 221. The communication circuit 220 is configured to communicate information from the system 200 via a network 250 (for example, the RS-486 Network shown in FIG. 2(a)).

The system 200 is wired or wirelessly coupled to a collection of sensors 240. The sensors shown are an accelerometer 241, a temperature sensor 242, a microphone 243, and a gyroscope 244. The sensors shown may be implemented individually, or in combination, to sense deformations of the tower 290. Each of the sensors 240 is capable of detecting a deformation, and electrically provides information of the sensing to the system 200.

As explained above, several deformations may exist that a tower realizes through a standard lifetime. In one example, one of, or a combination of the sensors, may be employed to detect a rotation of the tower 290. The rotation of tower 290 may cause the componentry on the tower 290 to face a different direction. For example, if a satellite dish is situated on the tower 290, the satellite dish may be facing another direction than originally installed.

In another example, the deformation detected may be displacement. Thus, if a component on the tower 290 is moved from point 'A' to point 'B' (for example, a location 5 feet away), due to the tower 290 being bent or moved due to the environmental conditions shown in FIGS. 1(a) and (b), the sensors 240 may detect a displacement deformation.

The system 200 interfaces with the sensors 240, records information of movement (or displacement) in real-time. The system 200 may then instruct the communications unit 220 to transmit the sensed information to a network 250. The network 250 may be any sort of network known in the art capable of receiving information remotely. The sensed information may be stored remotely.

On the receiving end, a second system (not shown), may also be provided. In one example, as shown in FIG. 12, a receiving server 1200 configured to interface with system 200 is illustrated. However, this implementation is purely exemplary, and other implementations may be used. The second system may be configured to detect whether the information from each sensor, some of the sensors 240, or all of the sensors 240 indicate a result over a predetermined threshold. The actual amount of displacement to trigger a detection of displacement may be configured by an implementer of system 200. For example, if the combination of sensors 240 shown detect 'X' movement, 'Y' acceleration, and other sorts of parameters, and the parameters are above a certain threshold (set in a predetermined fashion), the system 200 may transmit an alert to the second system (such as a server, or the like).

In another example, instead of merely detecting faults or deformations, the sensors 240 combined with the system 200 may be employed to perform data acquisition. Thus, the sensors 240 may record historical data over time for the purpose of providing logs associated with the tower 290's performance. For example, if the tower 290 is loaded with a specific weight or componentry, the deformations over time (i.e. both the rotational and displacement) deformations may be monitored and recorded. Accordingly, the weight and componentry placement may be optimized to ensure that the tower 290's deformations are under a specific and predetermined amount.

In certain cases, this monitoring may be employed to extend a field inspection cycle. Thus, a tower 290's owner or operator may effectively schedule visits to the tower 290 with intervals larger than tower 290's not implementing system 200. As such, the owner or operator may achieve cost savings associated with managing and monitoring the tower 290 for general performance or failures.

For example, the monitoring may be employed to detect certain issues related to fatigue associated with a tower 290. In one case, the guys may be loose (such as guys supporting a guyed mast). The monitoring associated with aspects disclosed herein may aid in the detection of this sort of condition.

In another example, the monitoring may lead to confirmation that more load than originally intended to be used with tower 290 is capable of being placed on the tower 290. Thus, a more efficient usage of tower 290's load capabilities may be achieved. In another example, the data recorded from system 200 may be correlated with data received from surrounding weather station data.

Thus, with the monitoring enumerated above, the tower 290's structural health may be maximized, field inspection costs may be reduced, repair due to environmental damage may occur at a quicker rate, and the tower assets may be maximized.

The system 200 may be programmed with various correction parameters associated with the tower 290 being implemented, the placement of the system 200 relative to the tower 290, the environment in which system 200 is implemented, and the like. Thus, based on the specific context, the parameters sensed may undergo a formulaic algorithm, the output of which indicates whether the tower 290 is likely to be displaced or malformed.

The sensors 240 may detect wind speed and direction, environmental conditions, weather related phenomena, a foreign object or person on the tower, harmonic resonances, and the like. The system 200 may be implemented on a weatherproof computer, such as a fanless computer configured to withstand environmental and other deleterious conditions (such as those shown in FIGS. 1(a) and (b)).

The system 200 may be upgradeable, and thus updates may be transmitted to the system 200, the sensors 240, that allow dynamic real-time configuration.

The sensors 240 listed above are not limited thereto, and an implementer of system 200 may augment, remove, or place different sensors based on an implementation sought after. Some sensors that may be additionally provided are, but not limited to, a wind sensor, lighting sensors, ice sensors, RF (radio frequency) sensors, a sound sensor, weather data sensors, global positioning sensors (GPS), and the like.

The central computer, that receives the information from the system 200, may be configured via numerous implementations. In one example, a cloud storage, or product cloud may be employed. The product cloud may be configured to be provided with a visualization tool to allow a monitor or team of monitors to view in real-time the effects of external conditions to a tower 290, or plurality of towers 290. The product cloud may be configured to couple the information received from the system 200 to various other business related activities.

The product cloud may be configured to store historical data, and keep a running log averaging data overtime.

FIG. 2(a) illustrates a system level implementation of the circuit 200 shown in FIG. 2(b). Essentially, the various specific elements are stripped, with the circuits 210-240 provided. As shown, when the system 200 is communicated a polling information via network 250, information 271 is provided back to the server 1200. The information 271 is associated with the information generated from the sensor bank 240, and processed by the MCU 230.

Figure 3:
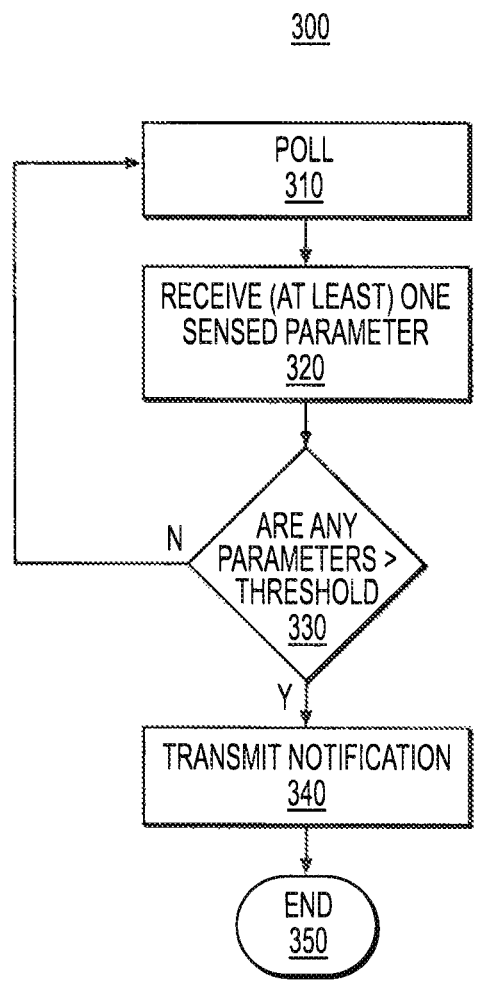
FIG. 3 illustrates an example of a method of operation of the processing disclosed with regards to the system shown in FIG. 2.

FIG. 3 illustrates an example method 300 employing the aspects disclosed herein describing a sample implementation of the processor 230. In operation 310, a polling signal is received requesting sensed data via the sensor bank 240. For example, the communications circuit 220 may be configured to receive the polling signal (as shown in FIG. 2(a)).

After which, in operation 320, at least one sensed parameter is sensed (via the sense bank 240). As explained above, one parameter may be sensed, some, or all of those shown associated with circuit 240.

In operation 330, a determination is made if any of the sensed parameters are over a predetermined threshold (set by an implementer of system 200). If so, in operation 340, a notification is transmitted, and the method 300 ends 350.

Alternatively, in operation 330, after a predetermined time, the operation 310 may perform again in an iterative fashion. The information 271, generation at operation 340 may be transmitted to a server 1200.

Figure 2C:
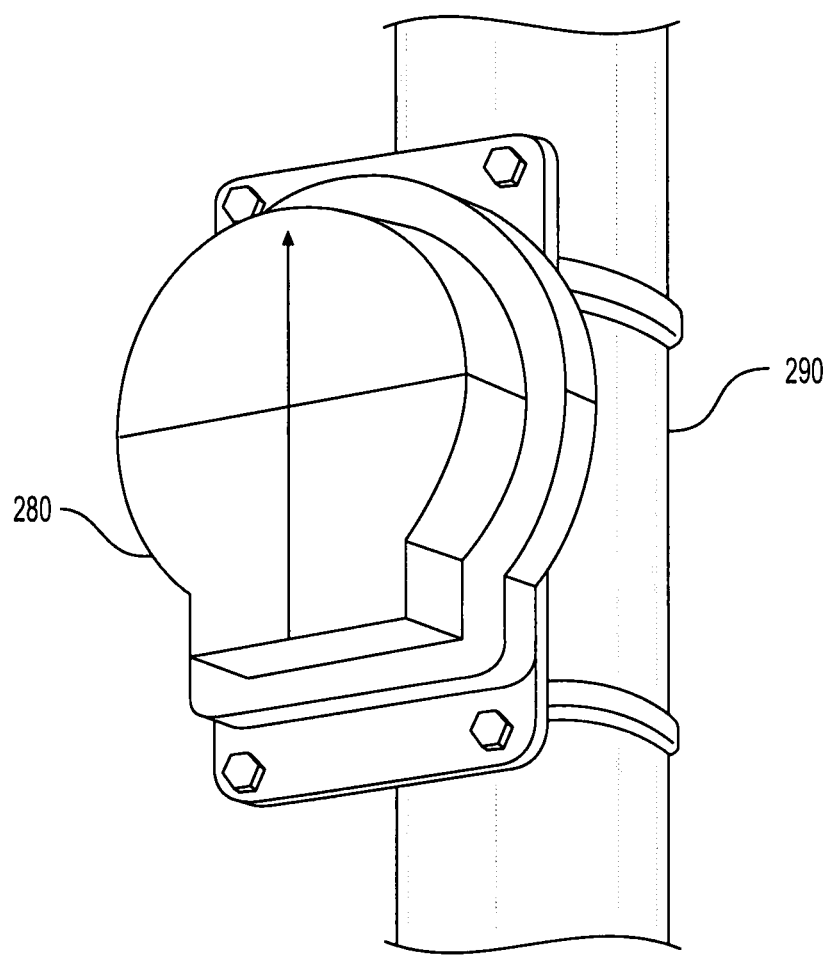

The circuitry shown in FIG. 2 is encased in a weather resistant casing 280, as shown in FIG. 2(c). As shown, the casing 280 straddles the tower 290 in the manner shown in FIG. 2(c). In other embodiments (not shown), the casing 280 may be affixed to the tower 290 in other ways. In the implantation shown, when the tower 290 is displaced (for any of the reasons enumerated in FIGS. 1(a) and (b)), the system 200 is configured to detect this displacement.

The casing 280 serves to protect the system 200, the sensors 240 from weather, environmental, and electrical conditions. For example, if lighting strikes the tower 290, plasma arc damage may occur.

The casing 280 may be designed in a way to mitigate these damages. For example, the casing 280 may be designed as a Faraday shield capable of protecting any internal circuitry from high energy electric fields.

The casing 280 may also be provided with a conductive gasket, so as to electrically seal the casing 280 and prevent leakage of radio frequency (RF) energy into the interior of the system 200 or the sensors 240.

Bonding hardware and solid or braided conductors are used to electrically connect the casing 280 to the tower 290. This connection creates a low-resistance, low-impedance electrical pathway from the tower mounted system 200 to ground (the structure) in order to assist in dissipating electrical energy from direct or transient lightning strike on or near the structure.

In addition to modifications made to the casing 280, novel protective circuitry may also be employed. This protective circuitry is installed on the power input and communications wiring connections to the system 200. RF protection is achieved by the use of pass-through capacitors built into the body of the casing 280.

Additionally, shielded cable, ferrite beads, and bypass capacitors are also employed in the implementation of system 200 and/or the casing 280. A polymeric positive temperature coefficient device connected in series with the direct current (DC) mains power input protects other devices in the system from an over-current condition caused by a short-circuit in the sensor electronics. A passive gaseous discharge tube (GDT) is used to conduct transient over-voltage conditions to the ground. Further, a metal-oxide varistor connected in series with the GDT prevents follow-on current effects typical for GDT type devices and prolongs the working life of the GDT device.

Additional protection against fast rise-time transients is provided by the use of a transient voltage suppressor (TVS) and steering resistor combination. The TVS is a semiconductor device which conducts electrical energy at voltages greater than its rated breakdown voltage to ground. A steering resistor is employed in the incoming direct current mains power circuit "downstream" of the TVS device in order to present a high-impedance path to incoming transients compared to the relatively lower impedance path of the TVS device biased into conduction.

Furthermore, the printed circuit board used inside the casing 280 is designed to avoid creating paths for transients to cross printed circuitry sections of the board. Printed circuit board mounting holes and other geometrical mechanical features are designed to prevent unintended electrical paths to ground. Printed circuit board traces are designed and manufactured to facilitate a clean, short, low-inductance path from the printed circuit board to the enclosure housing. Stray RF energy and transient over-voltages are then conducted through the casing 280 to the structure to which it is mounted and then to the ground.

Incoming communications circuits (i.e. the communication circuits 220) are protected in a similar fashion against transient over-voltage conditions. A GDT type device is used to shunt transient communication circuit over-voltages to ground. Series connected self-resetting "TBU" type devices based on metal-oxide semiconductor field-effect transistors which are capable of reacting to transient over-current conditions in less than one micro-seconds of time are utilized to block dangerous transient surge conditions.

Further, additional TVS devices are installed to shunt any remaining fast rise-time transient voltage spikes to ground. Similar techniques are employed on communication circuits to protect internal sensor circuitry from the effects of high energy RF fields as are employed on incoming direct current mains circuits.

Figure 4:
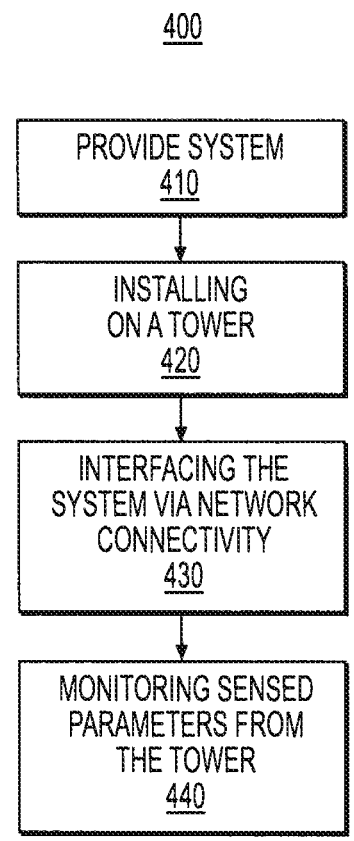

FIG. 4 illustrates a method 400 for implementing the systems shown herein. This is a high-level method flowchart, and captures the essence of the installations described herein.

In operation 410, a system such as that described in FIGS. 2(a) and (b) is provided. The system 200 is placed in a casing 280, such as that described in FIG. 2(c).

In operation 420, the system 200 is installed on a tower 290. FIGS. 5-11 illustrate various examples of the tower 290 being implemented with a variety of towers. The placement of system 200, the sensors 240, and the other componentry shown in FIG. 2 is exemplary. Thus, various modifications according to the aspects disclosed herein may be realized.

Figure 5:
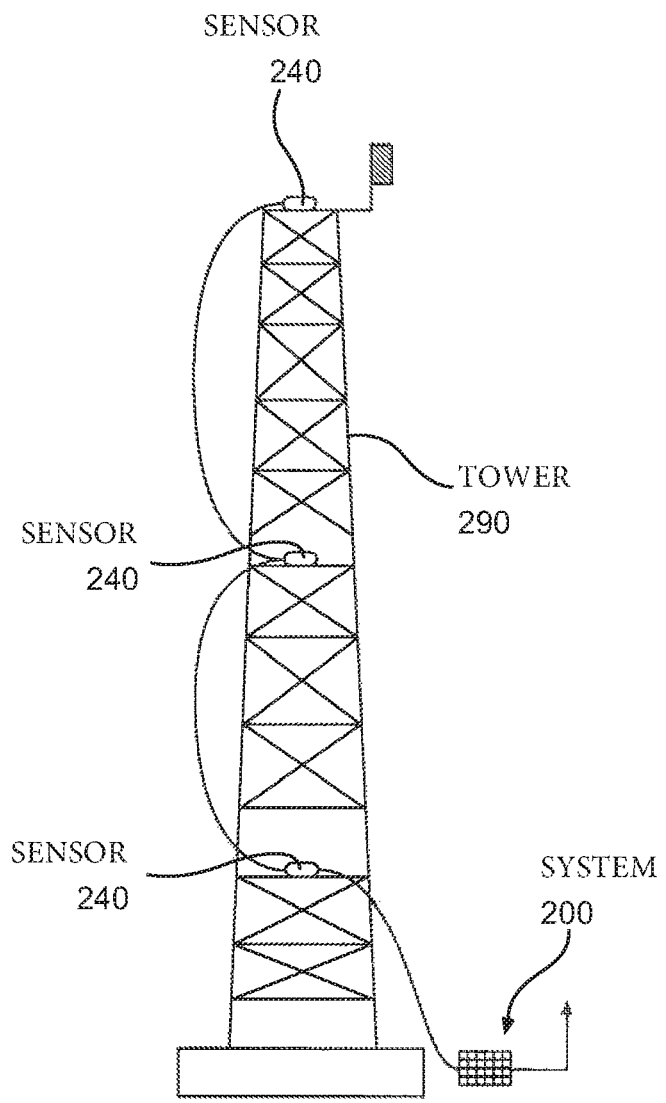
FIGS. 5-11 illustrate an example of the system in FIG. 2 implemented with a variety of towers.
Figure 6:
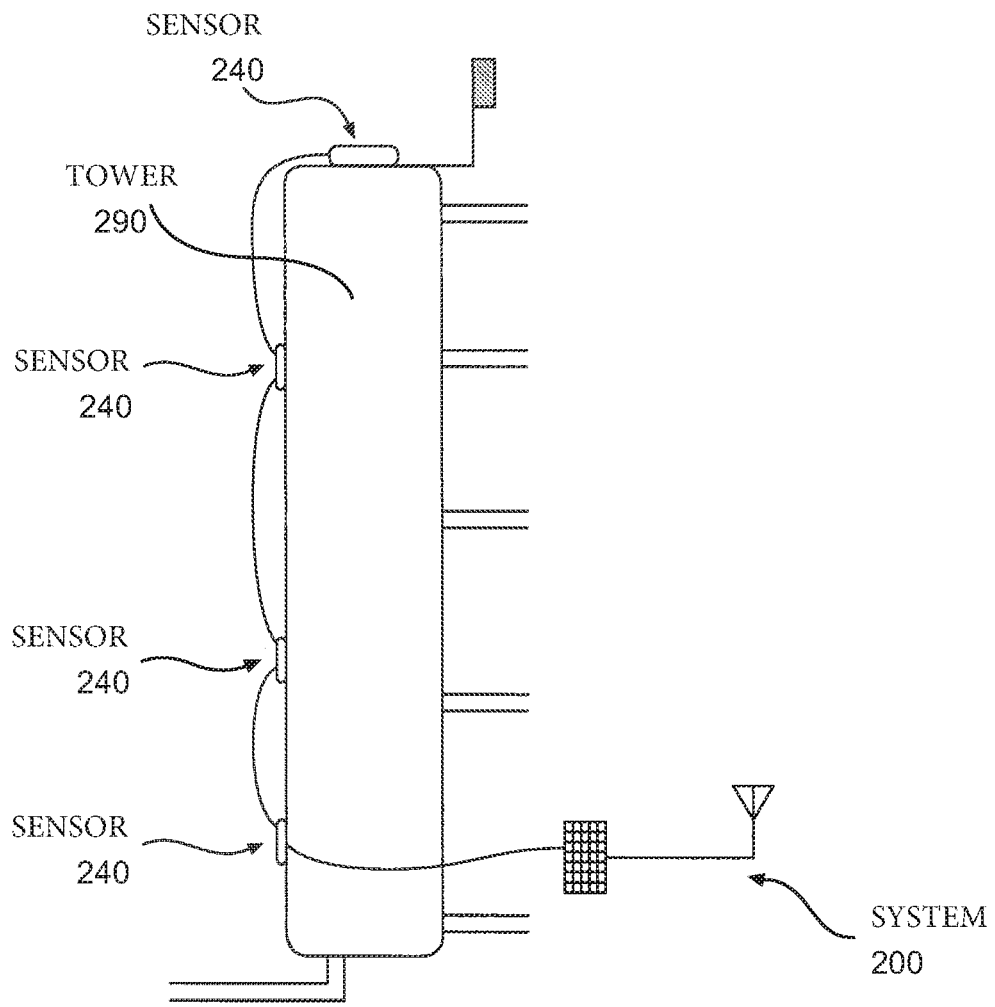

FIGS. 5 and 6 illustrate examples of a tower 290. Referring to the FIG. 7, the tower 290 is shown as a tower 290 with a structural support harness 600. Thus, employing the concepts disclosed herein, the system 200 may be situated at various portions of the tower 290, including the support harness 600.

Figure 7:
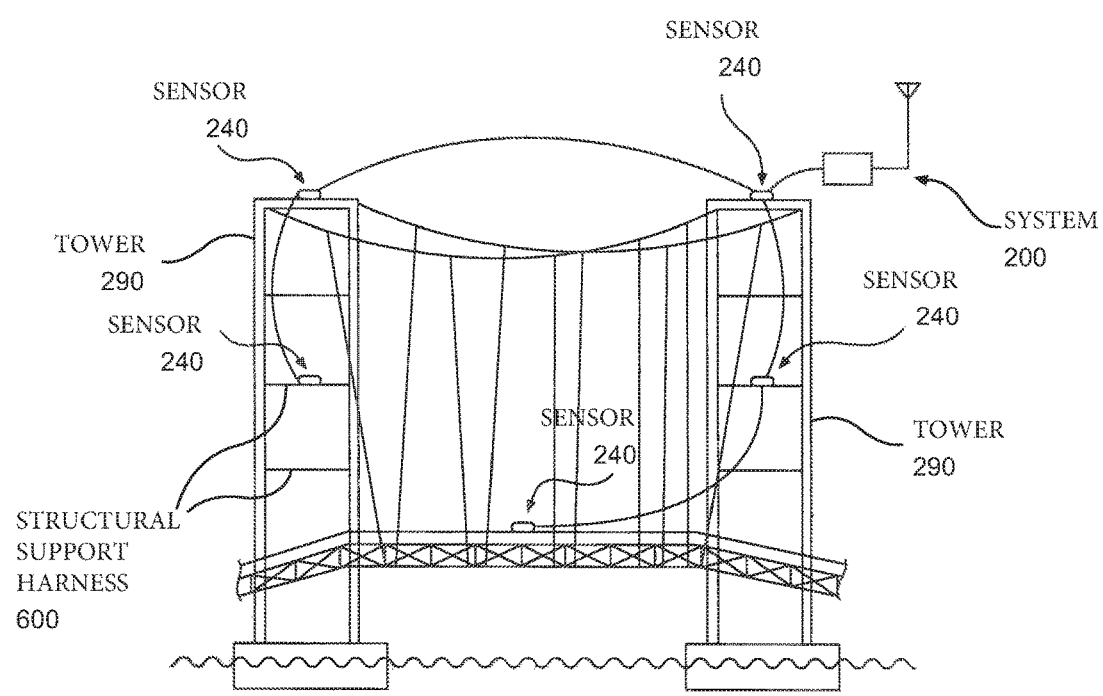
Figure 8:
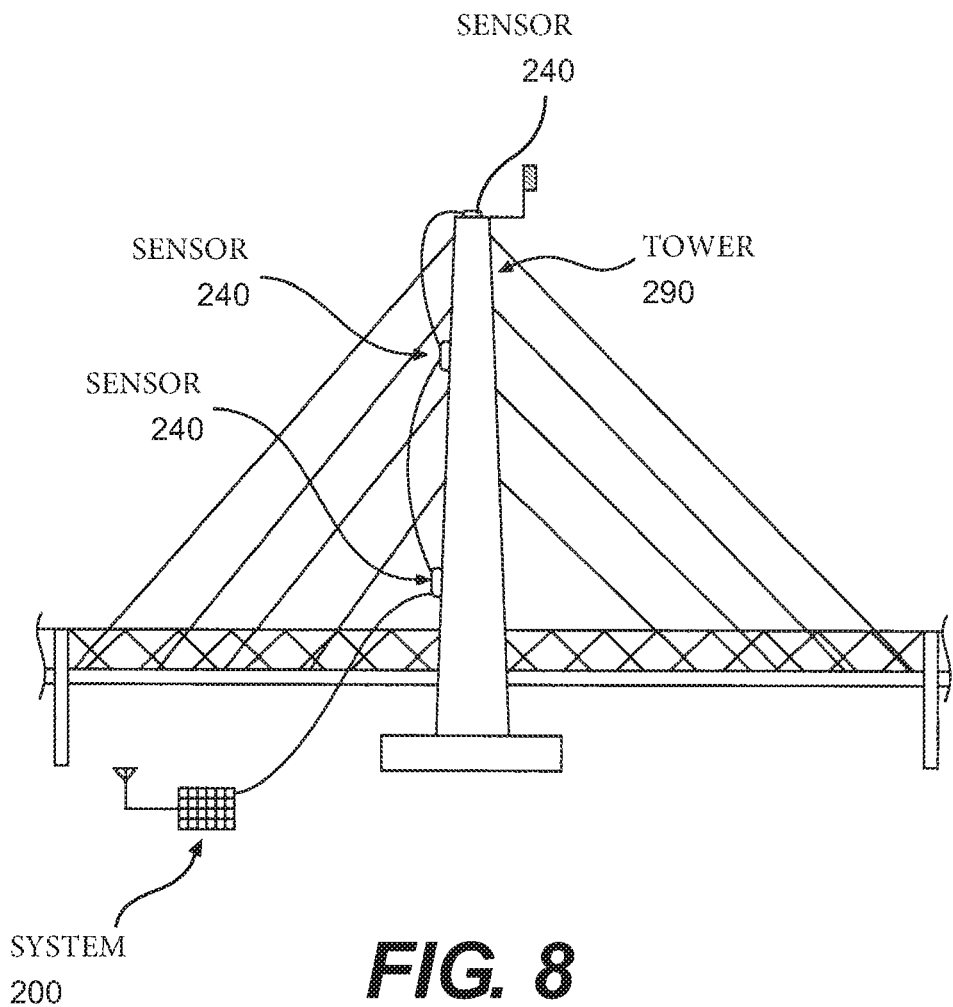
Figure 9:
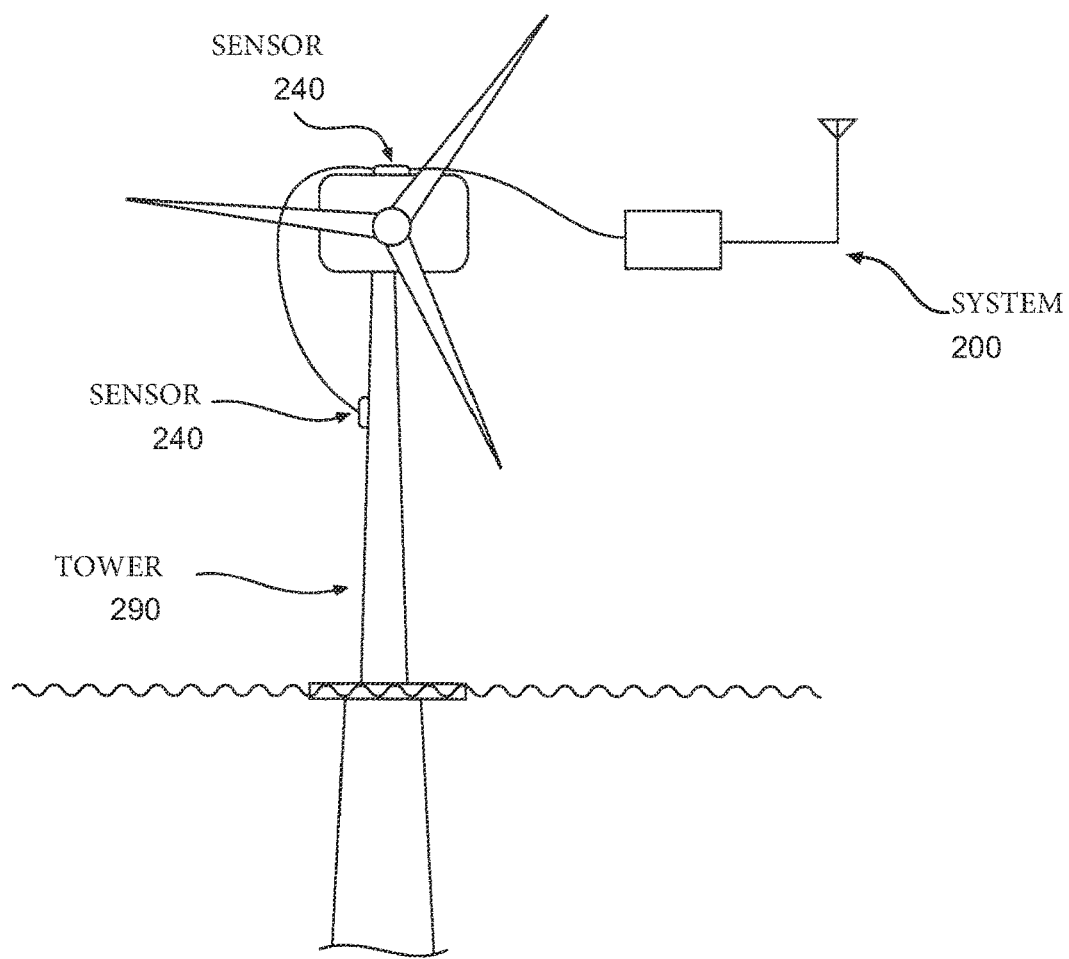
Figure 10:
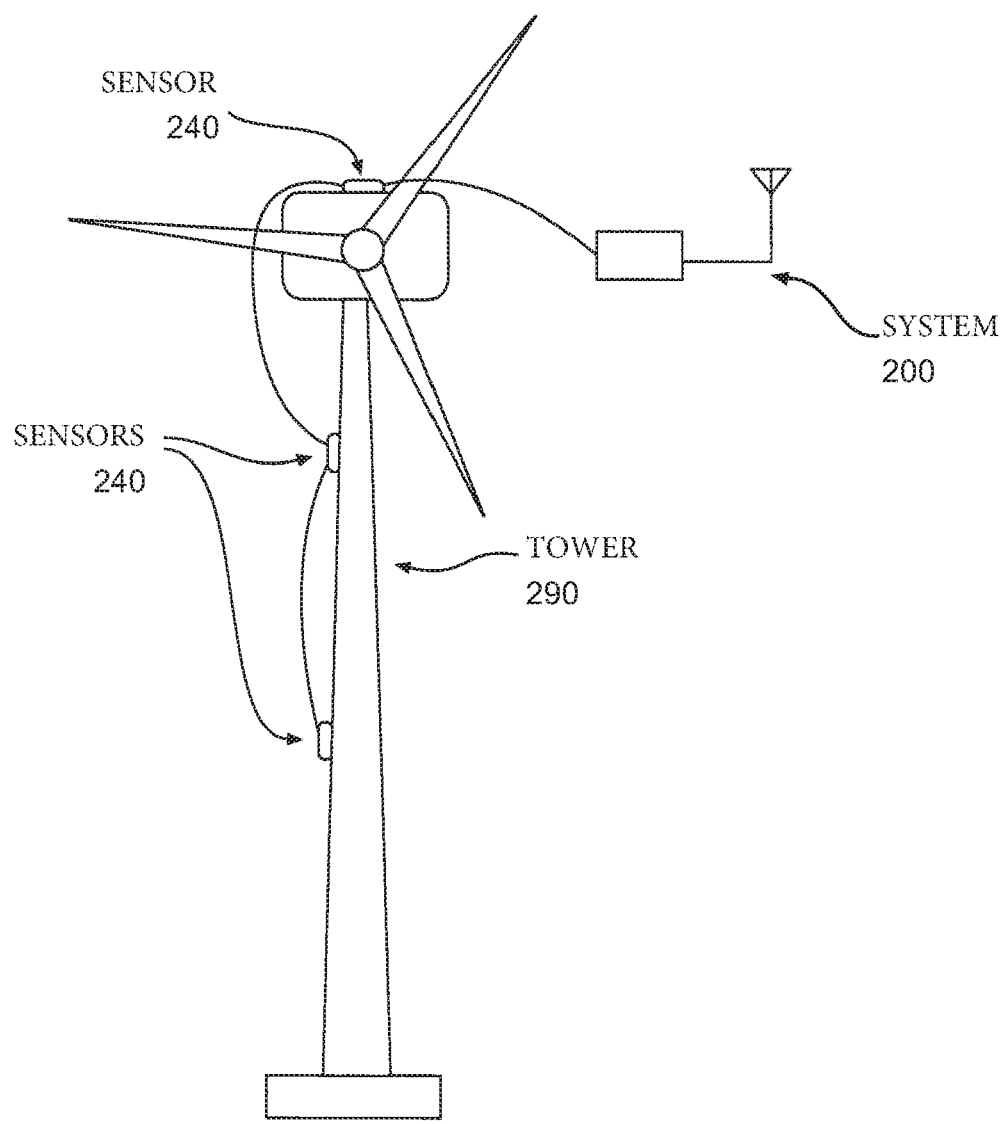
Figure 11:
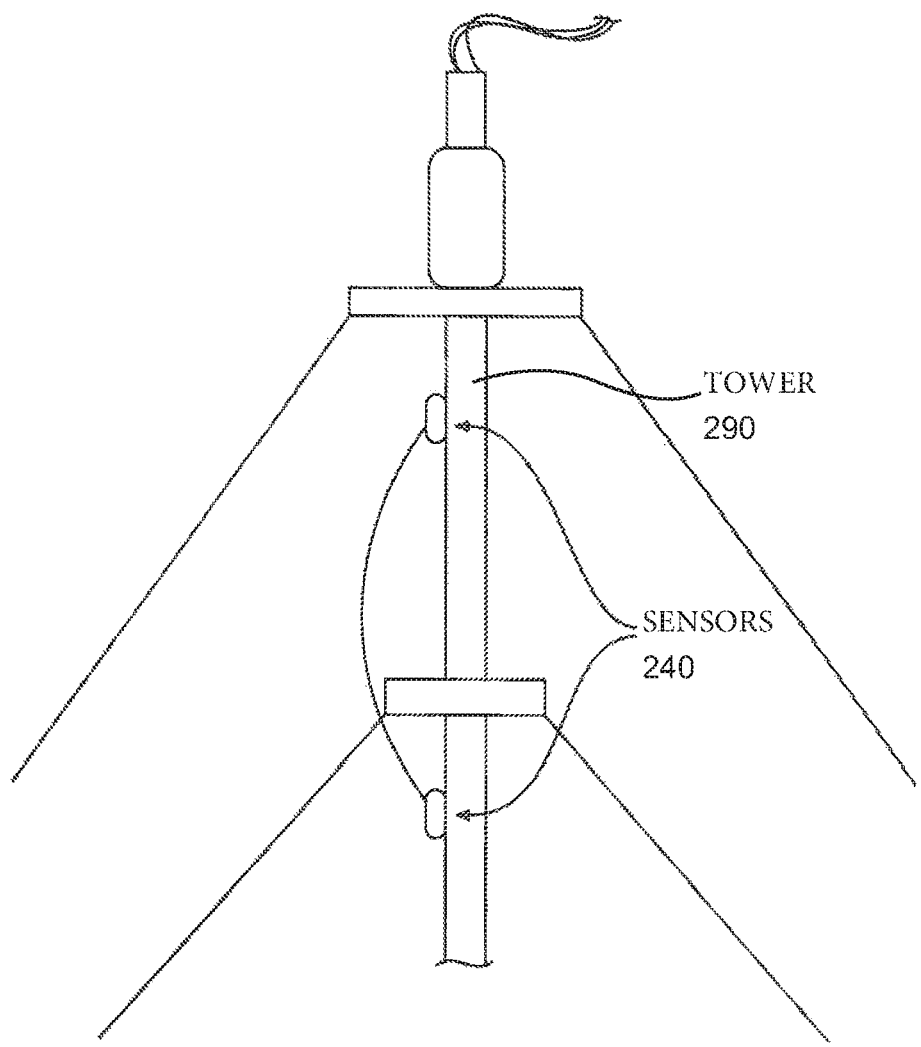

Referring to FIG. 8, the tower 290 includes a pipeline, and various connections coupling the multiple system 200s implemented in FIG. 7. Referring to FIGS. 9 and 10, the tower 290 is a wind power station. Further, as shown, the tower 290 is implemented in water. In FIG. 11, the tower 290 is implemented with support guy. Thus, the guy, which may be integral in providing support to prevent displacement, may be aided by the system 200 to help detect deformation (rotation and displacement) that would put too much strain on the structural integrity of tower 290.

In operation 430, the system 200 is provided with network capabilities, thereby connecting the system 200 with a server 1200. After which, in operation 440, the tower 290 is monitored according the aspects described above.

FIG. 12 illustrates an example system (or sever) 1200 for implementing the aspects disclosed herein. The system 1200, which may be implemented on a computer processor (for example, a non-transitory computer readable medium) may be implemented in a centralized location, and be configured to monitor sensed information from one or many towers and structures.

The information receiver 1210 is configured to receive information 271 (such as that generated above) with information regarding the sensing of a communications tower 290. The tower monitored 1220, processes the received information in a manner consistent with the aspects disclosed herein. Thus, if any of the sensed data is outside a predetermined threshold, a notifier 1230 may generate a notification signal 1231 alerting another system or operator that the tower 290 is in a sub-optimal state.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

We claim:

1. A circuit for monitoring a tower, comprising:
 a microcontroller circuit configured to control other elements of the circuit, including:
  a communications circuit configured to receive a polling signal from a remote location over a network, and to transmit an indication of a sensed parameter being outside a predetermined threshold;
  a sensor interfacer circuit configured to receive the sensed parameter from a sensor provided on the tower and to apply at least one correction parameter associated with a height of the sensor on the tower to the sensed parameter using a formulaic algorithm to determine whether the sensed parameter is outside the predetermined threshold,
 a case for enclosing the circuit,
 wherein the case is attached to a portion of the tower that extends in a perpendicular direction from a surface of the earth on which the tower is installed on, and
 the sensed parameter being defined as a movement of only the tower.

2. The circuit according to claim 1, wherein the sensor interface is further configured to receive a plurality of sensed parameters from a plurality of sensors provided on the tower and located at different heights on the tower.

3. The circuit according to claim 1, further comprising a backup power circuit.

4. The circuit according to claim 2, wherein one of the plurality of sensors is from a list comprising: an accelerometer, a microphone, and a gyroscope.

5. The circuit according to claim 1, wherein a weather proof casing is provided.

6. The circuit according to claim 1, further being provided on multiple towers, and monitored via a centralized server.

7. The circuit according to claim 6, wherein the centralized server, is situated in a location remote to the multiple towers, and is configured to provide a notification based on the sensed parameter being outside the predetermined threshold.

8. The circuit according to claim 1, wherein the case is provided with bonding hardware.

9. The circuit according to claim 8, wherein the bonding hardware is defined as solid conductor.

10. The circuit according to claim 8, wherein the bonding hardware is defined as a braided conductor.

11. The circuit according to claim 4, wherein at least two of the plurality of sensors are employed to determine a failure.

12. The circuit according to claim 7, wherein the predetermined threshold is selected based on a value corresponding to a non-failure state of the tower.

13. The circuit according to claim 1, wherein the sensed parameter is a change in rotation of only the tower.

14. The circuit according to claim 1, wherein the sensed parameter is adjusted based on an environmental condition in a context in which the tower is installed.

15. The circuit according to claim 1, wherein the sensed parameter is a change in displacement of only the tower.

16. The circuit according to claim 1, wherein the sensed parameter is a change in displacement and rotation of only the tower.

17. The circuit according to claim 1, wherein the microcontroller circuit is further configured to correlate the sensed parameter with weather data.

\* \* \* \* \*